United States Patent
Jang

(12) 
(10) Patent No.: US 7,014,324 B2
(45) Date of Patent: Mar. 21, 2006

(54) DEVICE FOR CONTROLLING PROJECTION LENS SHIFT IN A PROJECTOR

(75) Inventor: Kyoung-choul Jang, Gyeonggi-do (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 0 days.

(21) Appl. No.: 10/889,173

(22) Filed: Jul. 13, 2004

(65) Prior Publication Data
US 2005/0117127 A1 Jun. 2, 2005

(30) Foreign Application Priority Data
Nov. 27, 2003 (KR) .................... 10-2003-0085137

(51) Int. Cl.
G03B 21/00 (2006.01)
G03B 21/14 (2006.01)
G03B 3/00 (2006.01)
G02B 7/02 (2006.01)

(52) U.S. Cl. .................. 353/101; 353/69; 353/119; 359/813; 359/822

(58) Field of Classification Search ............ 353/69, 353/70, 100, 101, 119; 359/813, 822, 827
See application file for complete search history.

(56) References Cited

U.S. PATENT DOCUMENTS

| 4,896,132 A | 1/1990 | Land ............................ 353/94 |
| 6,547,402 B1* | 4/2003 | Masuda ...................... 353/101 |
| 6,755,540 B1* | 6/2004 | Runco ......................... 353/101 |
| 2005/0030491 A1* | 2/2005 | Gishi ........................... 353/101 |
| 2005/0030492 A1* | 2/2005 | Gishi ........................... 353/101 |
| 2005/0052627 A1* | 3/2005 | Lee et al. .................... 353/100 |

FOREIGN PATENT DOCUMENTS

| JP | 7/120700 A | 5/1995 |
| KR | 1998-063831 A | 10/1998 |
| KR | 10-0200143 B1 | 3/1999 |

\* cited by examiner

*Primary Examiner*—Melissa Jan Koval
(74) *Attorney, Agent, or Firm*—Sughrue Mion, PLLC

(57) ABSTRACT

A device for controlling the projection lens shift in a projector is provided, and includes a projection lens module which enlarges and projects an incident light on a screen, a sliding bracket which supports the projection lens module, a fixed bracket which slidably supports the sliding bracket, a shift unit positioned between the fixed bracket and the sliding bracket selectively to slide the sliding bracket up and down according to its rotating direction, and an elastic unit provided at a lower part of the projection lens module elastically to support the projection lens module.

13 Claims, 6 Drawing Sheets

DEVICE FOR CONTROLLING PROJECTION LENS SHIFT IN A PROJECTOR

CROSS REFERENCE TO RELATED APPLICATIONS

This application claims the benefit of Korean Application No. 2003-85137, filed Nov. 27, 2003, in the Korean Intellectual Property Office, the disclosure of which is incorporated herein by reference.

BACKGROUND OF THE INVENTION

1. Field of the Invention

An apparatus consistent with the present invention relates to a device for controlling the projection lens shift of a projector.

2. Description of the Related Art

With the development of information technologies, a video projecting apparatus using a liquid crystal display (LCD) has been widely supplied and developed to meet the need to reproduce images on a large screen.

The video projecting apparatus generally comprises a projector for producing, enlarging and projecting images on a screen. The projector can be classified into two types, such as a front projection type and a rear projection type, depending on how images are projected on the screen.

The front projection type projector comprises a light source for generating light, an image generator for generating images and a projection lens module with a plurality of projection lenses for enlarging and projecting generated images on the screen.

The image generator consists of a means for splitting light emitted from the light source, for example, into three colors of red, green and blue, a liquid crystal panel for receiving and outputting split light and a prism. The image generator and the projection lens module are inclusively called "an engine part" which is mounted within a case.

The project lens module comprises first and second projection lens units which approach and separate from each other in order to focus an image projected on the screen.

A lens shift control device is provided to adjust the height of the projection lens module by moving the module upward or downward. FIG. 1 illustrates a lens shift control device as disclosed in Korean Patent Publication No. 10-1998-063831. Referring to FIG. 1, a projection lens module 1 comprises a plurality of lens barrels 2, 3 and 4 and is supported by a support plate 5 which can vertically slide along a rail 6a of a frame 6. When a shift rod 8 connected on a retainer 7 fixed to the frame 6 is rotated, a bolt section 8a of the shift rod 8 interacts as a screw with a nut section 9 fixed to the support plate 5. Accordingly, the frame 6 moves up and down, thereby enabling the user to adjust the height of the projection lens module 1.

In the conventional lens shift control device, since one end of the projection lens module 1 is supported by the support plate 5, the other end is apt to slope down due to the weight of the projection lens module 1. Therefore, the friction between the rail 6a and the support plate 5 increases, and the projection lens module 1 is prevented from smoothly shifting up and down. As a result, a great force is required to shift up the projection lens module 1 which is sloped due to its own weight.

In addition, since the shift rod 8 is displaced from the center of gravity of the projection lens module 1, the user needs to apply much force to operate the shift rod 8.

SUMMARY OF THE INVENTION

Accordingly, the present invention has been made to solve the above-mentioned problems in the related art, and an aspect of the present invention is to provide a device for controlling the projection lens shift of a projector, having an improved structure that can easily control the shifting of a projection lens module.

In order to accomplish the above aspect of the present invention, there is provided a device for controlling the projection lens shift in a projector, which comprises a projection lens module which enlarges and projects incident light on a screen; a sliding bracket which supports the projection lens module; a fixing bracket which slidably supports the sliding bracket; a shift unit positioned between the fixing bracket and the sliding bracket selectively to slide the sliding bracket up and down according to its rotating direction; and an elastic unit provided at a lower part of the projection lens module elastically to support the projection lens module.

The shift unit includes a retainer formed on the fixed bracket; a nut section formed on the sliding bracket corresponding to the retainer; and a shift rod rotatably supported by the retainer and having a screw section connected to the nut section.

The shift unit is positioned at the center of a horizontal width perpendicular to the shifting axis of the projection lens module.

Also, the shift unit is positioned above the center of the projection lens module.

The elastic unit includes a housing fixed at a distance from the lower part of the projection lens module; a support member sliding in and out of the housing and supporting the lower part of the projection lens module; and a spring received within the housing to elastically compress the support member toward the projection lens module.

Also, the elastic unit may be placed to support the center of the horizontal width perpendicular to the shifting direction of the projection lens module.

In addition, the elastic unit may be located at a predetermined distance from the sliding bracket with respect to the optical axis of the module in order to prevent the module from sloping down due to its own weight.

BRIEF DESCRIPTION OF THE DRAWINGS

The above aspect and other advantages of the present invention will be more apparent from the following detailed description taken in conjunction with the accompanying drawings, in which.

DETAILED DESCRIPTION OF THE ILLUSTRATIVE, NON-LIMITING EMBODIMENTS OF THE INVENTION

Hereinafter, an illustrative, non-limiting embodiment of the present invention will be described in detail with reference to the accompanying drawings.

Figure 1:
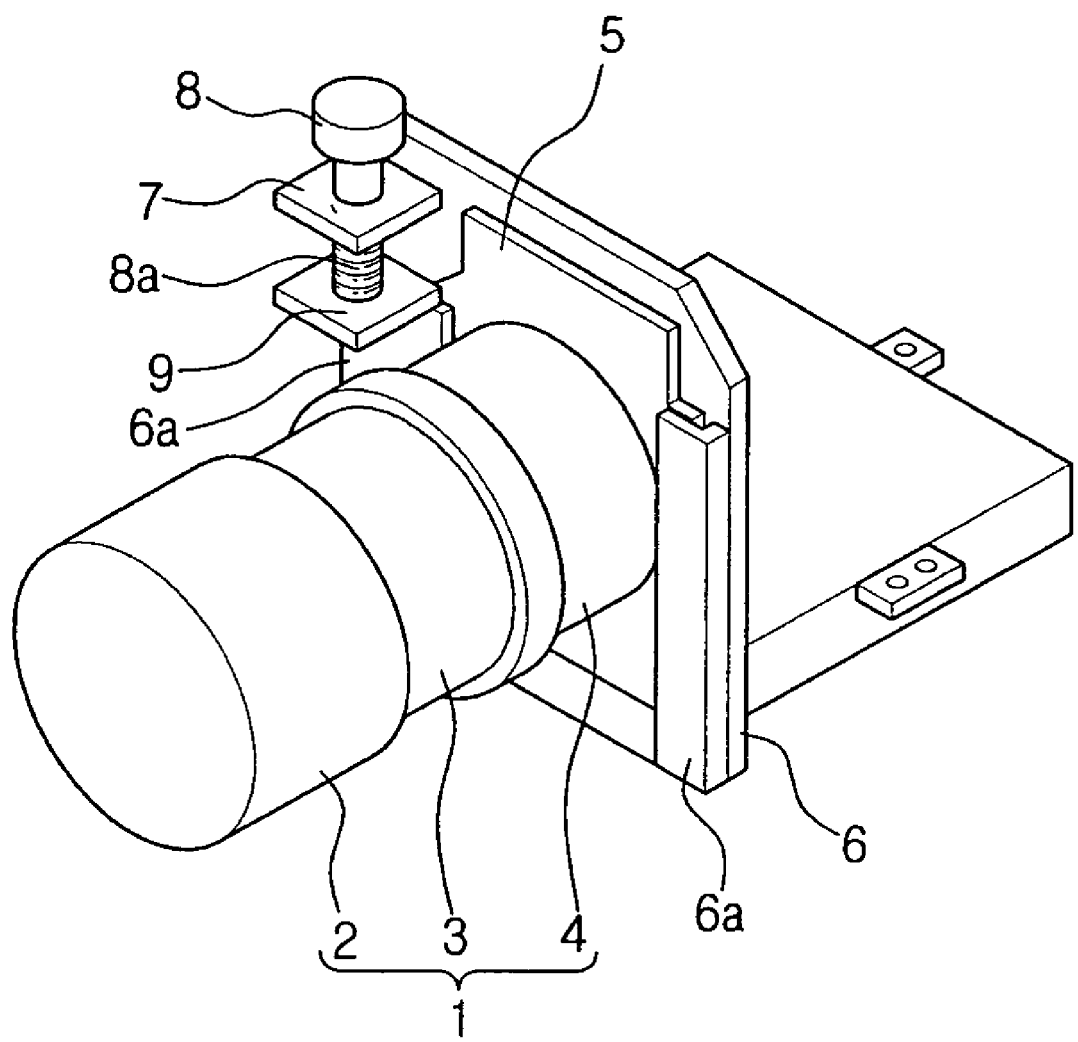
FIG. 1 illustrates a conventional device for controlling the projection lens shift of a projector.
Figure 2:
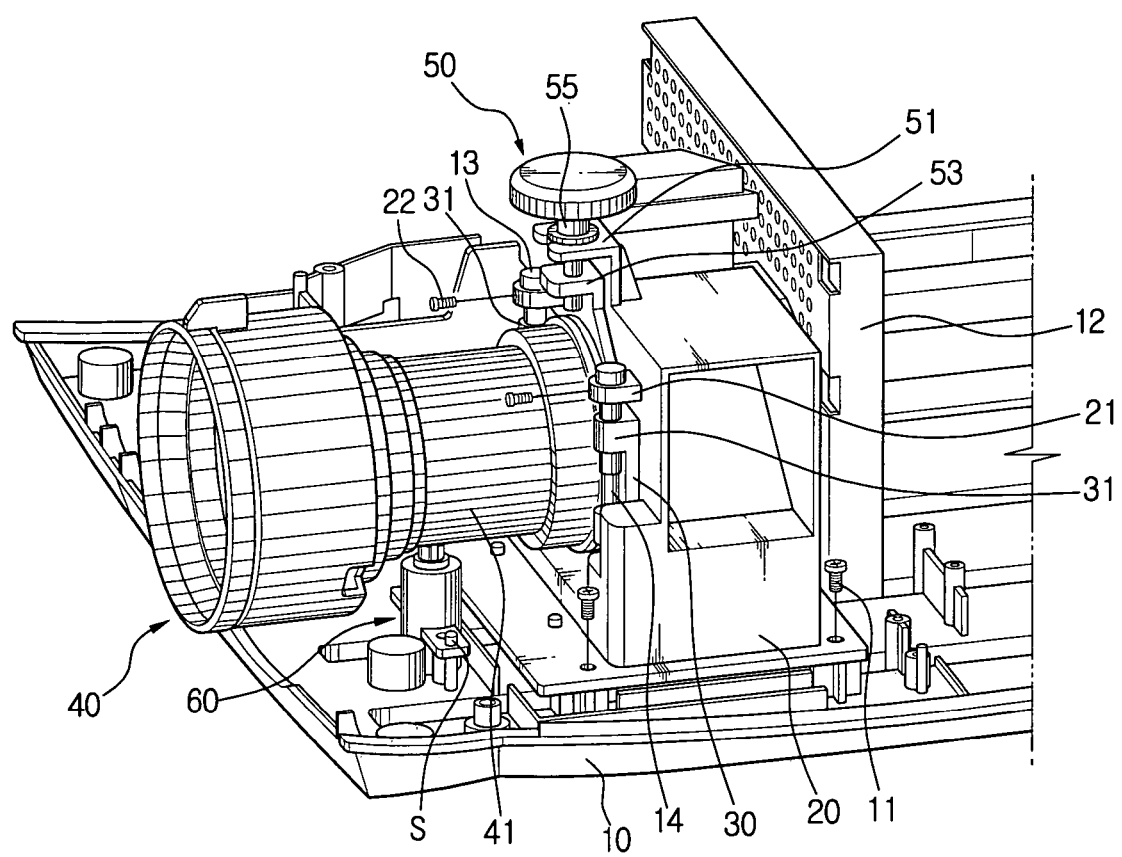
FIG. 2 is a perspective view of a projection lens shift controlling device according to an exemplary embodiment of the present invention.

Referring to FIG. 2, a device for controlling the projection lens shift in a projector according to an illustrative, non-limiting embodiment of the present invention comprises a fixing bracket 20 mounted on a base frame 10, a sliding bracket 30 capable of vertically sliding on the fixing bracket 20, a projection lens module 40 supported by the sliding bracket 30, a shift unit 50 for moving the sliding bracket 30 up and down on the fixing bracket 20 and an elastic unit 60 for elastically supporting the lower part of the projection lens module 40.

A circuit unit including a circuit board (not shown) is provided on the base frame 10. Also, a cover member (not shown) for covering all the above-mentioned elements is provided to cover a top of the base frame 10.

The fixing bracket 20 is fixed to the base frame 10 by a screw 11. A light source (not shown), a color splitter (not shown) for splitting light emitted from the light source into three colors of red, green and blue, and an LCD device 12 are provided on the fixing bracket 20. The light source, color splitter, LCD device 12 and projection lens module 40 are inclusively referred to as "an engine part". Since the structure and function of the engine part per se are generally known in the art, a detailed explanation thereof will be omitted.

Figure 3:
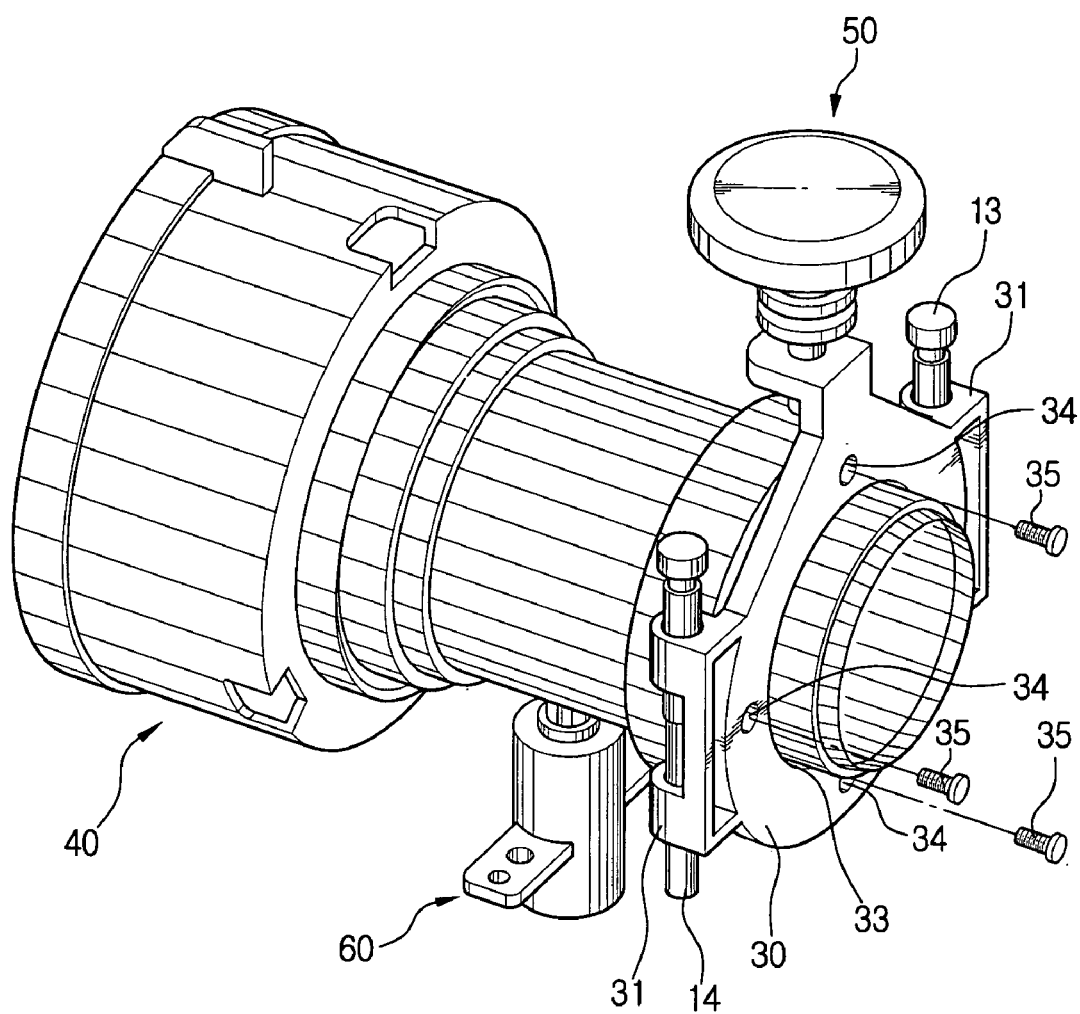
FIG. 3 is a perspective view of the main parts of the projection lens shift control device of FIG. 2.
Figure 4:
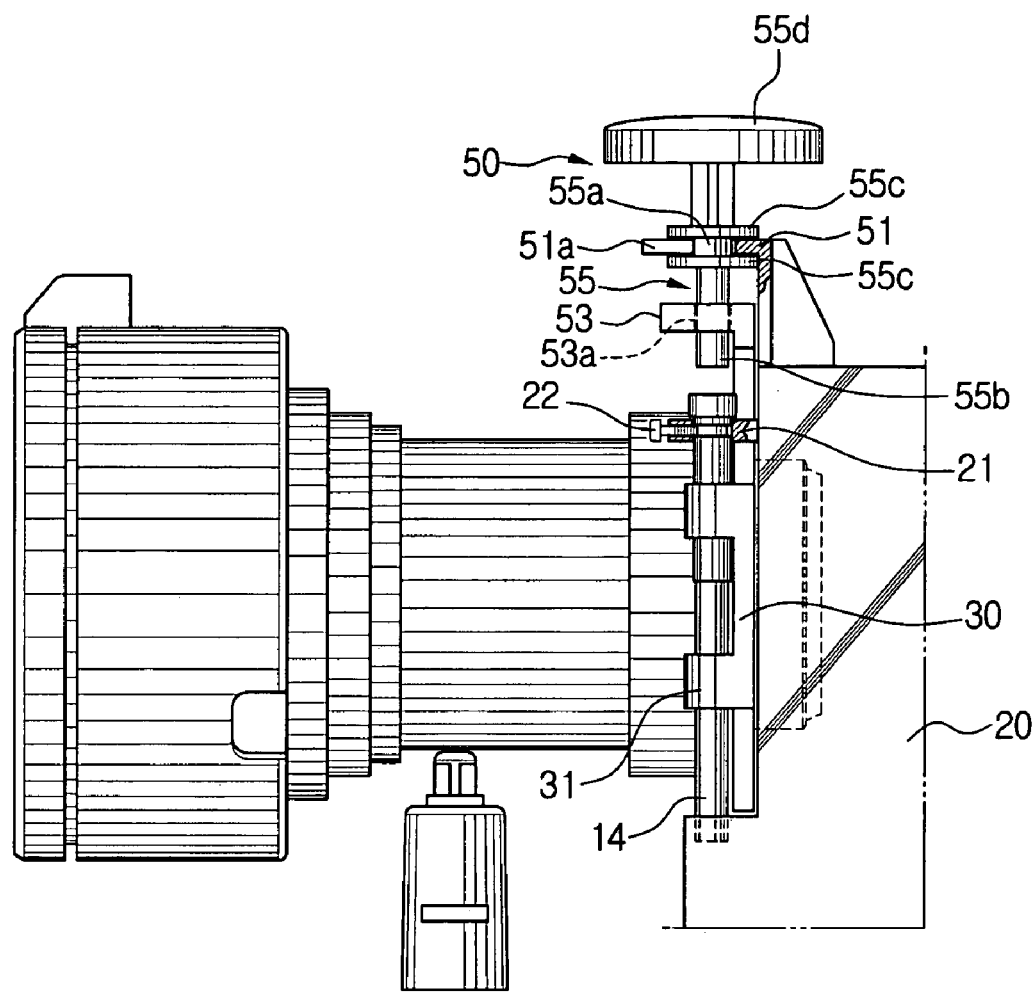
FIG. 4 is a front view of the projection lens shift control device of FIG. 3.

The sliding bracket 30 is slidably supported by the fixing bracket 20. As shown in FIG. 3, the sliding bracket 30 has a pair of guide sections 31 in which guide shafts 13 and 14 can be slidably inserted. With the sliding bracket 30 being contacted to the fixing bracket 20, the guide shafts 13 and 14 are inserted into connecting sections 21 of the fixing bracket 20 and the guide sections 31. Then, the sliding bracket 30 is connected to the fixing bracket 20 and guided by the guide shafts 13 and 14 when sliding up and down. The guide shafts 13 and 14 are fixed to the fixing bracket 20. As shown in FIG. 4, each connecting section 21 has a screw 22. By fastening the screw 22, the guide shafts 13 and 14 are each compressed by the end of the screw 21 so as not to slip or come out from the connecting sections 21. Thus, the sliding bracket 30 can slide up and down along the guide shafts 13 and 14.

As shown in FIG. 3, one end of the projection lens module 40 is inserted into a connecting hole 33 formed at the center of the sliding bracket 30. More specifically, one end of the projection lens module 40 is inserted in a connecting hole 33, and the projection lens module 40 and the sliding bracket 30 are secured to each other by screws 35 through a plurality of screw holes 34 formed around the connecting hole 33.

The projection lens module 40 enlarges and projects an image generated by the LCD device 12 onto the screen. On an optical path within a lens barrel 41, a zoom lens group and a focus lens group are provided to independently operate. Since the structure and function of the projection lens module 40 per se are generally known in the art, a detailed explanation thereof will be omitted.

The shift unit 50 is used selectively to shift the projection lens module 40 up and down. The shift unit 50 comprises a retainer 51 formed on the fixing bracket 20, a nut section 53 formed on the sliding bracket 30 corresponding to the retainer 51 and a shift rod 55.

The retainer 51 is integrally formed to the fixing bracket 20. The retainer 51 is bent from the fixing bracket 20 to be disposed over the sliding bracket 30. The retainer 51 has a shaft hole 51a into which the shift rod 55 is rotatably inserted.

The nut section 53 is provided to face the retainer 51 at a predetermined distance right under the retainer 51. The nut section 53 is integrated with the sliding bracket 30. The nut section 53 has a nut hole 53a having a screw thread.

Figure 5:
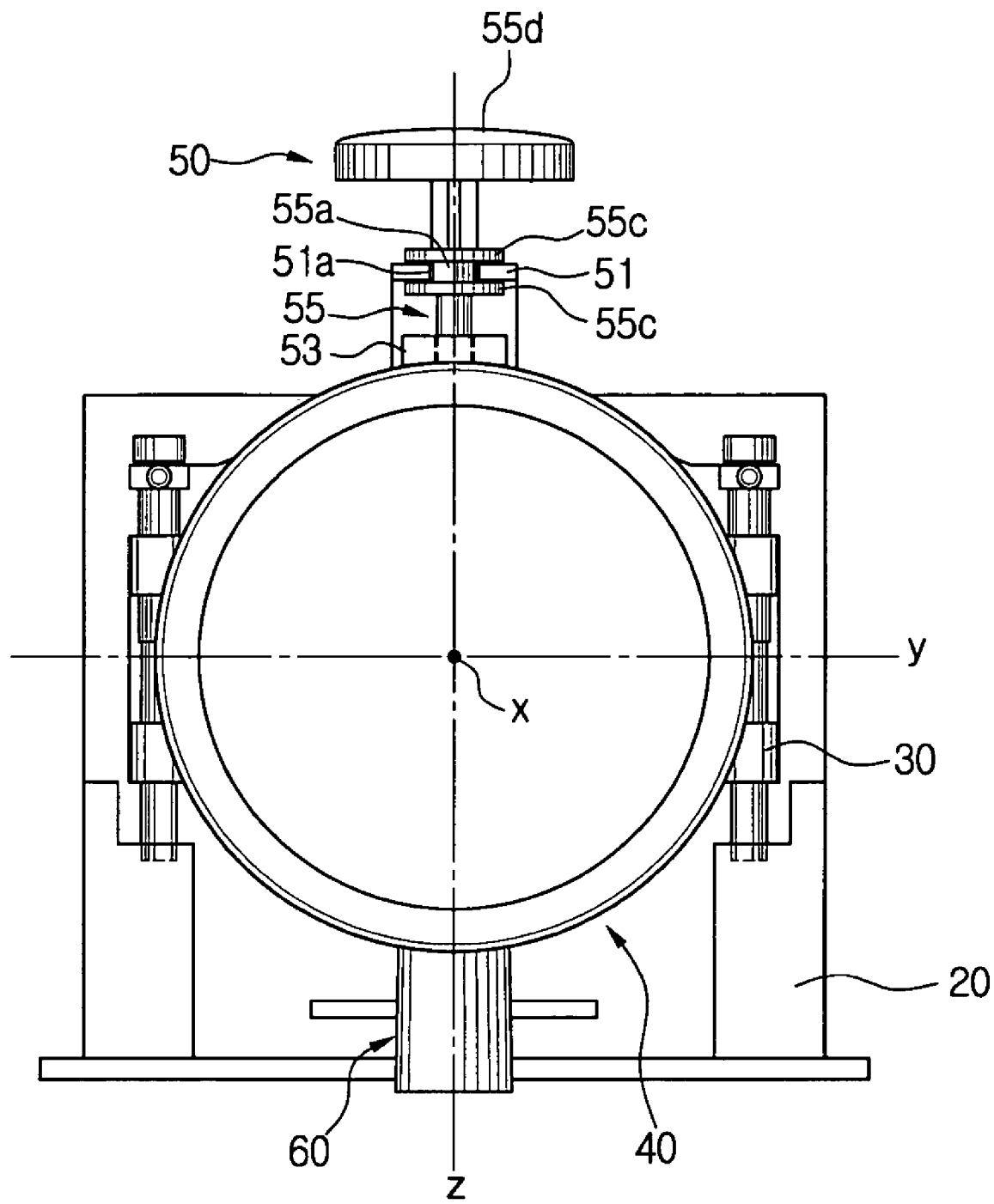
FIG. 5 is a left-side view of the projection lens shift control device of FIG. 4.

The nut section 53 and the retainer 51 are disposed above the projection lens module 40. Moreover, the nut section 53 and the retainer 51 may be disposed at the center of the width in the horizontal direction y perpendicular to the optical axis x of the projection lens module 40 as shown in FIG. 5. The projection lens module 40 has a center of gravity at the center of the width along the y-axis direction. Since the farther the shift unit is away from the center of gravity, the greater the force is required to control the lens shift, the user can easily control the shifting of the projection lens module 40 with the least amount of force.

The shift rod 55 has a support section 55a rotatably supported by the retainer 51 and a screw section 55b having a screw thread on an outer circumference to be secured into the screw hole 53a of the nut section 53. A pair of flanges 55c are formed at upper and lower parts of the support section 55a in order to prevent the shift rod 55 from moving up and down within the retainer 51. Additionally, an operation handle 55d is formed on top of the shift rod 55 to facilitate rotation of the shift rod 55. The operation handle 55d can be separately manufactured and coupled to the support section 55a. Alternatively, the operation handle 55d can be integrally formed on the support section 55a.

Figure 6:
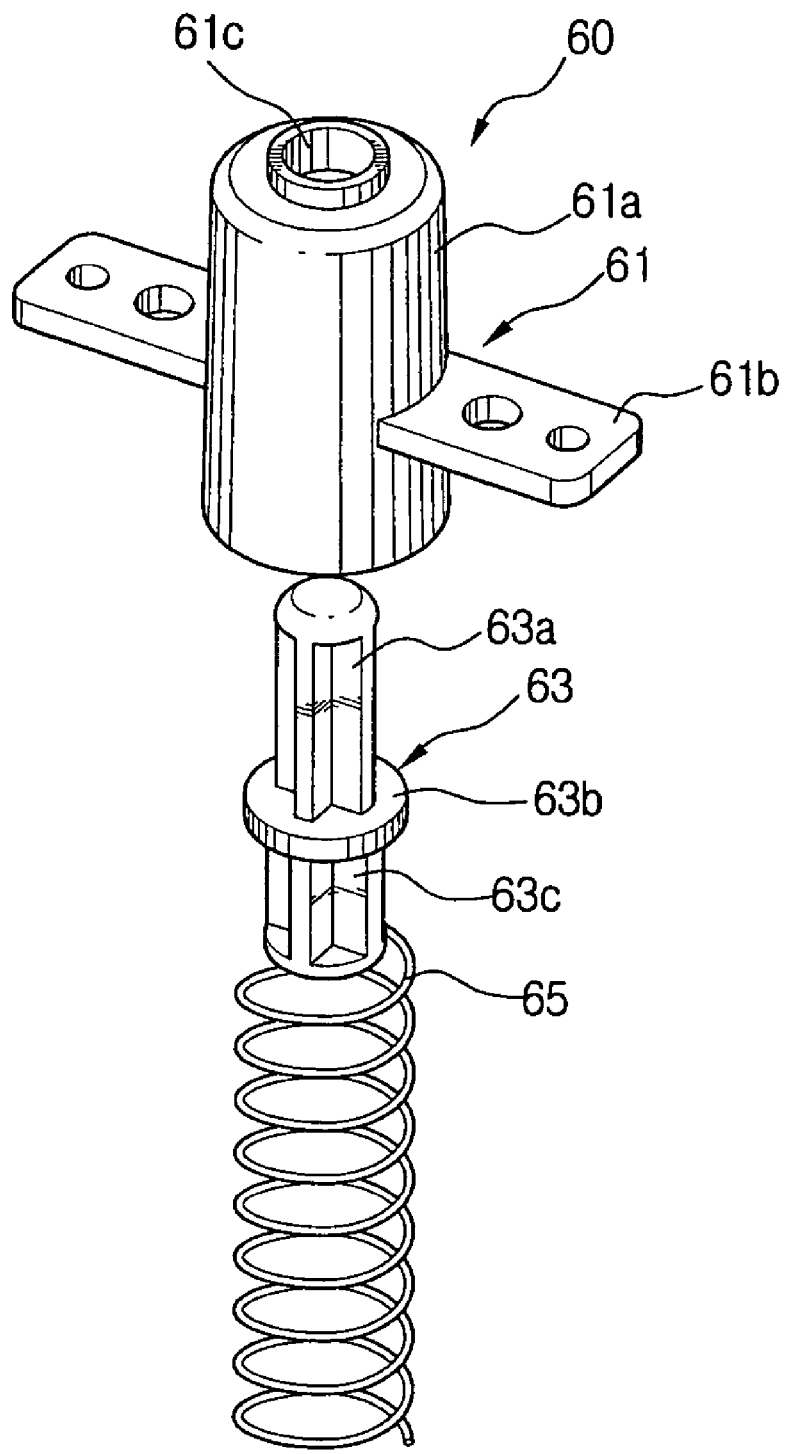
FIG. 6 is an exploded perspective view showing the elastic unit of FIG. 2.

As shown in FIG. 6, the elastic unit 60 comprises a housing 61 fixed onto the base frame 10 (see FIG. 2), a support member 63 which can slide in and out of the housing 61, and a spring 65. As shown in FIG. 2, the housing 61 is fixed onto the base frame 10 by a screw S. For this, the housing 61 has a pair of support sections 61b projecting outwardly from a cylindrical body 61a and having a screw hole. Also, an opening 61c for allowing the support member 63 to slide in or out is formed on top of the cylindrical body 61a. The bottom of the cylindrical body 61a is opened to receive the support member 63 and the spring 65.

The support member 63 is slidably received within the housing 61. The support member 63 comprises an operation section 63a which comes in and out through the opening 61c, a flange 63b extending from the outer circumference of the operation section 63a, and a spring support section 63c. The flange 63b has an outer diameter greater than the inner diameter of the opening 61c in order to prevent the support member 63 from completely coming out through the opening 61c. The spring support section 63c extending downward from the flange 63b is inserted in the spring 65. The support member 63 contacts and supports the lower part of the projection lens module 40.

The spring 65 is a coil spring which is received in the housing 61 having the spring support section 63c inserted therein. The spring 65 with the lower end supported by the base frame 10 compresses the support member 63 toward the projection lens module 40. Accordingly, the lower part of the projection lens module 40 can be elastically supported by the support member 63.

The elastic unit 60 having the above structure is located opposite to the shift unit 50 with respect to the x-axis. More specifically, the elastic unit 60 is located below the center of the projection lens module 40 on the y-axis in order to elastically support the module 40 and prevent the module 40 from sloping down due to its own weight. Since one end of the module 40 is supported by the fixing bracket 20 in the manner of a cantilever, it is preferable, but not necessary, to locate the elastic unit 60 at a predetermined distance from the sliding bracket 30 in order to prevent the other end of the module 40 from sloping down due to its own weight. In other words, the elastic unit 60 is preferably, but not necessarily, located at a predetermined distance from the shift unit 50 on the x-axis.

According to an embodiment of the present invention, the height of a picture projected on the screen is adjustable by rotating the shift rod 55. Due to the weight of the projection lens module 40, the user can easily rotate the shift rod 55 and lower the module 40. The user only needs to slightly rotate the operation handle 55*d* while pressing it by a finger. Then, the shift rod 55 is smoothly rotated to lower the module 40.

On the other hand, when the user rotates the operation handle 55*d* in the opposite direction, the weight of the projection lens module 40 is offset to become zero by the elastic force of the elastic unit 60, and therefore, the projection lens module 40 is naturally raised. Therefore, the user can easily control the vertical shifting of the projection lens module 40 by the operation handle 55*d*.

As described above, the projection lens shift control device according to the present invention comprises an elastic unit elastically supporting the lower part of the projection lens module, thereby compensating for the eccentric load of the projection lens module and enabling the stable shifting of the module.

In addition, since the elastic unit offsets the load of the projection lens module to become zero when the module is raised, the user can easily raise the projection lens module with the same or similar force as required to lower the module.

Although an exemplary embodiment has been described for illustrative purposes, the present invention is not to be unduly limited to the configuration or operation set forth herein. Those skilled in the art will appreciate that various modifications, additions and substitutions are possible, without departing from the scope and spirit of the invention as disclosed in the accompanying claims.

What is claimed is:

1. A device for controlling the projection lens shift of a projector, said device comprising:
    a projection lens module which enlarges and projects incident light on a screen;
    a sliding bracket which supports the projection lens module;
    a fixing bracket which slidably supports the sliding bracket;
    a shift unit positioned between the fixing bracket and the sliding bracket selectively to slide the sliding bracket up and down to move an optical axis of the lens module according to a rotating direction of the shift unit; and
    an elastic unit provided at a lower part of the projection lens module elastically to support the projection lens module.

2. The device according to claim 1, wherein the shift unit comprises:
    a retainer formed on the fixed bracket;
    a nut section formed on the sliding bracket corresponding to the retainer; and
    a shift rod rotatably supported by the retainer and having a screw thread section connected to the nut section.

3. The device according to claim 2, wherein the shift unit is positioned at the center of a horizontal width perpendicular to a shifting axis of the projection lens module.

4. The device according to claim 3, wherein the shift unit is positioned above the center of the projection lens module.

5. The device according to claim 1, wherein the elastic unit comprises:
    a housing fixed at a distance from the lower part of the projection lens module;
    a support member slidably disposed for sliding in and out of the housing and supporting the lower part of the projection lens module; and
    a spring received within the housing elastically to bias the support member toward the projection lens module.

6. The device according to claim 2, wherein the elastic unit comprises:
    a housing fixed at a distance from the lower part of the projection lens module;
    a support member slidably disposed for sliding in and out of the housing and supporting the lower part of the projection lens module; and
    a spring received within the housing elastically to bias the support member toward the projection lens module.

7. The device according to claim 3, wherein the elastic unit comprises:
    a housing fixed at a distance from the lower part of the projection lens module;
    a support member slidably disposed for sliding in and out of the housing and supporting the lower part of the projection lens module; and
    a spring received within the housing elastically to bias the support member toward the projection lens module.

8. The device according to claim 4, wherein the elastic unit comprises:
    a housing fixed at a distance from the lower part of the projection lens module;
    a support member slidably disposed for sliding in and out of the housing and supporting the lower part of the projection lens module; and
    a spring received within the housing elastically to bias the support member toward the projection lens module.

9. The device according to claim 1, wherein the elastic unit is placed to support the center of a horizontal width perpendicular to the shifting direction of the projection lens module.

10. The device according to claim 2, wherein the elastic unit is placed to support the center of a horizontal width perpendicular to the shifting direction of the projection lens module.

11. The device according to claim 4, wherein the elastic unit is placed to support the center of a horizontal width perpendicular to the shifting direction of the projection lens module.

12. The device according to claim 9, wherein the elastic unit is located at a predetermined distance from the sliding bracket with respect to the direction of the optical axis of the module in order to prevent the module from sloping down due to the module's own weight.

13. The device according to claim 1, wherein the elastic unit is positioned to press against an outer periphery of the projection lens module.

\* \* \* \* \*